US012066810B2

(12) United States Patent
Kriveshko et al.

(10) Patent No.: US 12,066,810 B2
(45) Date of Patent: Aug. 20, 2024

(54) CONTINUOUS MONITORING OF A WORKCELL SAFETY SYSTEM

(71) Applicant: VEO ROBOTICS, INC., Waltham, MA (US)

(72) Inventors: Ilya A. Kriveshko, Boxborough, MA (US); Lev Persits, Cambridge, MA (US); Scott Denenberg, Newton, MA (US); Paul Jakob Schroeder, Brookline, MA (US); Robert Craig Randall, Newton, MA (US); Valentina Chamorro, Somerville, MA (US); Gene Malkin, Brookline, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 609 days.

(21) Appl. No.: 17/358,108

(22) Filed: Jun. 25, 2021

(65) Prior Publication Data

US 2022/0004162 A1    Jan. 6, 2022

Related U.S. Application Data

(60) Provisional application No. 63/048,349, filed on Jul. 6, 2020.

(51) Int. Cl.
*G02B 27/10* (2006.01)
*G05B 19/406* (2006.01)
*G06T 7/00* (2017.01)

(52) U.S. Cl.
CPC .......... *G05B 19/406* (2013.01); *G06T 7/0008* (2013.01); *G05B 2219/50193* (2013.01); *G06T 2207/30164* (2013.01)

(58) Field of Classification Search
CPC .............. G05B 19/402; G05B 19/4061; G05B 19/0428; G06T 7/001; H04N 7/0357; H04N 13/204; H04L 1/0041; G01S 7/497; G06F 11/076
See application file for complete search history.

(56) References Cited

U.S. PATENT DOCUMENTS

| 2018/0222050 A1 | 8/2018 | Vu et al. |
| 2020/0073358 A1* | 3/2020 | Dedkov ................. B25J 9/1666 |
| 2020/0077074 A1 | 3/2020 | Denenberg et al. |

OTHER PUBLICATIONS

Extended European Search Report for European Application No. 21183099.7, dated Nov. 15, 2021, 8 pages.

* cited by examiner

*Primary Examiner* — Phuoc H Doan
(74) *Attorney, Agent, or Firm* — Morgan, Lewis & Bockius LLP (57) ABSTRACT

Systems and methods for continuously monitoring a workcell during operation of industrial machinery are disclosed. The system may comprise a safety system that includes at least one sensor and supporting software and/or hardware for acquiring image data associated with the workcell; a monitoring system for detecting a parameter value associated with the safety system; and a controller configured to determine a status of the safety system based at least in part on the detected parameter value and cause an alert to be issued if the status of the safety system does not satisfy a target objective.

45 Claims, 2 Drawing Sheets

CONTINUOUS MONITORING OF A WORKCELL SAFETY SYSTEM

CROSS-REFERENCE TO RELATED APPLICATION

This application claims priority to and the benefit of, and incorporates herein by reference in its entirety, U.S. Ser. No. 63/048,349, filed on Jul. 6, 2020.

FIELD OF THE INVENTION

The field of the invention relates, generally, to monitoring of industrial environments where humans and machinery interact or come into proximity, and in particular to systems and methods for detecting unsafe conditions in a monitored workspace.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, various types of "guarding" equipment have been developed to separate humans and machines, thereby preventing machinery from causing harm to humans. One very simple and common type of guarding is a cage that surrounds the machinery, configured such that opening the door of the cage causes an electrical circuit to place the machinery in a safe state (e.g., shutting down the machinery). This ensures that humans can never approach the machinery while it is operating in an unsafe state.

Separation of humans and machines, however, is not always optimal for productivity. For example, some tasks are best performed by a human and machine working collaboratively; machines typically provide more strength, faster speed, more precision, and more repeatability, while humans may offer flexibility, dexterity, and judgment far beyond the abilities of even the most advanced machines. An example of a potential collaborative application is the installation of a dashboard in a car—the dashboard is heavy and difficult for a human to maneuver but easy for a machine, and attaching it requires a variety of connectors and fasteners that require human dexterity and flexibility to handle correctly. Cage guarding, however, is insufficiently flexible and adaptable to allow this type of collaboration. Therefore, these situations are typically resolved either by automating aspects of the task best performed by a human, often at great expense and complication, or using a human worker to perform aspects of the task better done by a robot (perhaps using additional equipment such as lift-assist devices) and tolerating potentially slow, error-prone, and inefficient execution that may lead to repetitive stress injuries or exposure to hazardous situations for human workers.

More sophisticated types of guarding may involve, for example, optical sensors. Examples include light curtains that determine if any object has intruded into a region monitored by one or more light emitters and detectors, and two-dimensional (2D) LIDAR sensors that use active optical sensing to detect the minimum distance to an obstacle along a series of rays emanating from the sensors (and thus can be configured to detect either proximity or intrusion into pre-configured 2D zones). In addition, 3D depth sensors have been recently employed in various machine-guarding applications for providing guarding improvement. Examples of the 3D depth sensors include 3D time-of-flight cameras, 3D LIDAR, and stereo vision cameras. These sensors offer the ability to detect and locate intrusions into the area surrounding industrial machinery in 3D, which gives them several advantages over 2D sensors. For example, a 2D LIDAR system guarding the floorspace around an industrial robot will have to stop the robot when an intrusion is detected well over an arm's-length distance away from the robot, because if the intrusion represents a person's legs, that person's arms could be much closer and would be undetectable by the 2D LIDAR. However, a 3D system can allow the robot to continue to operate until the person actually stretches his or her arm towards the robot. This allows for a much tighter coupling between the actions of the machine and the actions of the human, which provides flexibility in many applications and saves space on the factory floor, which is always at a premium.

Although improved guarding based on 3D sensing may enable industrial engineers to design processes where each subset of the task is optimally assigned to a human or a machine without sacrificing the safety of human workers, several challenges inherently exist in using the 3D sensors in a safety-critical environment. First, the sensor itself must meet functional safety standards (see, e.g., U.S. Pat. Nos. 10,887,578 and 10,887,579, the entire disclosures of which are hereby incorporated by reference). In addition, the raw output of a 3D sensor cannot be used directly in most applications since it is much richer and harder to analyze than the data provided by 2D sensors. 3D sensor data thus requires processing in novel ways to generate effective and reliable control outputs for industrial machinery. Another challenge with systems based on 3D data is the difficulty in configuring and registering the systems and 3D sensors.

Even with 2D sensors, configuring safety guarding can be challenging. First, specific zones are usually designed and configured for each use case, taking into account the specific hazards posed by the machinery, the possible actions of humans in the workspace, the workspace layout, and the location and field of view of each individual sensor. It can be difficult to calculate the optimal shapes of exclusion zones, especially when trying to preserve safety while maximizing available floor space and system throughput.

Thus, configuring guarding technology requires advanced skill sets or tools, and while more robust 3D sensing promises greater opportunity for human-robot collaboration, it also presents new challenges. Mistakes in the configuration can result in serious safety hazards, requiring significant overhead in design and testing. In addition, because human safety is at stake, the industrial robot, human and/or workspace have to be continuously monitored during operation of the robot. If any changes are made to the workspace, the configuration may have to be redone in order to avoid safety hazards. Further, the performance (e.g., latencies, noise, etc.) of the safety system may be affected by environmental and equipment variations; thus, it may also be necessary to continuously monitor the performance of the safety system to ensure that it remains within the desired level. Accordingly, there is a need for approaches that reliably and continuously monitor the workspace and performance of the safety system during operation of the machinery, and which accommodate the complex data streams associated with 3D sensor technology.

SUMMARY

Embodiments of the present invention continuously monitor a workspace around industrial machinery using a safety system and may also monitor the status (e.g., health, aging, performance, etc.) of the safety system. In various embodiments, the safety system includes one or more 3D image sensors. Prior to activating the machinery, an initial calibration or registration process is performed to calibrate and/or register the 3D image sensors to the workspace. Data obtained by the 3D image sensors during the initial calibration/registration process may be processed and characterized into two categories—"moving" elements, which are supposed to move during operation of the machinery, and "static" elements, which are supposed to be static during operation of the machinery. Volumetric pixels ("voxels") or other suitable forms of volumetric representation associated with the moving and static elements may then be stored in memory. Static elements may also be identified as surfaces with associated normals. Both volumetric and surface representations can be captured over multiple frames, and statistics can be captured for use in post-processing. In one implementation, the voxels or surfaces associated with the static elements are identified as the "background" against which later frames can be compared during operation of the machinery for background validation. For example, if the background elements acquired during operation of the machinery deviate from their positions acquired during the initial calibration/registration process, the static elements may be misaligned from their initial positions or have been removed from the workspace; as a result, tracking of the workspace utilizing the acquired 3D image sensor data may be inaccurate. Thus, the calibration/registration or background capture process may be performed again to correct the errors for ensuring human safety.

The volumetric or surface representation of the static elements may also be used to estimate a pose error of the 3D sensors. This is often called registration validation. For each new set of 3D images captured during operation, robust pose estimation can be performed and the estimated poses can be compared against thresholds established during calibration. For example, these thresholds may be measures such as root mean squared error (RMSE), percentage count and/or absolute error for an inlier set of data and are compared to the static element representation. If the thresholds are exceeded, a pose error is reported.

Additionally or alternatively, the data obtained by the 3D sensors during the machinery operation may be analyzed and tracked for consistency with the moving elements. A set of rules grounded in physics and the layout of the workspace can be used to validate that the 3D data captured makes physical sense. For example, objects should not appear and disappear anywhere other than near identified entry points of the workspace. Objects should also not move faster than certain velocities or float through the workspace. These conditions could indicate system failure. The moving element may be (or moving elements may include) a robot, in which case robot position validation can be used both to validate a robot's reported instantaneous position and to verify sensor registration. If data from one or more sensors indicate a robot position deviating from the reported position but a majority of sensors indicate the correct position, an error is reported and the deviating sensors may be recalibrated automatically. If any sensor indicates (or multiple sensors indicate) a robot position different from that reported by the robot, then an error is reported.

In some embodiments, one or more environmental sensors (e.g., humidity sensors and/or temperature sensors) are employed to monitor the status (e.g., health, aging and/or performance) of the 3D sensors, thereby ensuring tracking accuracy of the workspace. For example, because temperature variations resulting from system-generated heat and/or humidity variations in the ambient environment may affect the 3D sensors' baseline calibration, accuracy, and operating parameters (such as temperature or illumination levels), it may be necessary to monitor the temperature and/or humidity at the locations of the 3D sensors. In one implementation, an operating range of the temperature and/or humidity associated with the 3D sensors that does not cause significant variations in their performance (e.g., the latency, noise, and/or focus) is empirically determined prior to activating the 3D sensors for monitoring the workspace. After the 3D sensors are activated to monitor the workspace, the environmental sensors are also activated to continuously measure the temperature/humidity around the 3D sensors. If the detected temperature and/or humidity conditions of the 3D sensors are within the predetermined ranges, operation of the 3D sensors and machinery can continue. If, however, the detected temperature and/or humidity conditions are outside the predefined ranges, the acquired 3D sensor data may be unreliable. As a result, a shutdown of the machinery may be necessary to prevent safety hazards.

Additionally or alternatively, an operating timer may be implemented to keep track of a total cumulative operating time of the 3D sensors. When a predetermined total cumulative operating time has been exceeded, the timer may issue an alert for maintenance or replacement of the sensors. In some embodiments, the data acquired by the 3D sensors are continuously analyzed in real-time to determine the performance (such as the latency, noise, and/or focus) associated with the 3D sensors. In addition, the 3D sensors may include modules for self-detecting errors of the signals therein. In one implementation, a safety-rated protocol may be established based on a common protocol, such as error-correcting codes or cyclic redundancy checks, to detect errors occurring during data transmission. Again, upon detecting the errors and/or unsatisfactory performance of the 3D sensors and/or other software and/or hardware components in the safety system, the system may issue an alert to the human operator or take other appropriate action.

Accordingly, in a first aspect, the invention relates to a system for continuously monitoring a workcell during operation of industrial machinery. In various embodiments, the system comprises a safety system comprising at least one sensor and supporting software and/or hardware for acquiring image data associated with the workcell; a monitoring system for detecting a parameter value associated with the safety system; and a controller configured to determine a status of the safety system based at least in part on the detected parameter value and cause an alert to be issued if the status of the safety system does not satisfy a target objective.

In various embodiments, the monitoring system comprises at least one temperature sensor for monitoring a temperature associated with the at least one sensor and/or at least one humidity sensor for monitoring humidity associated with an environment of at least one sensor. The monitoring system may comprise at least one timer for recording a total cumulative operating time of at least one sensor, the timer being configured to transmit a signal to the controller when a predetermined total cumulative operating time has been exceeded.

At least one of the image-acquisition sensors may be a 3D sensor, e.g., a time-of-flight (ToF) sensor, which may itself include a module for self-detecting errors of signals. In various embodiments, the monitoring system comprises a safety-rated protocol for detecting errors occurring during data transmission between at least one sensor, the supporting software and/or hardware, and the controller. The acquired image data may comprise a plurality of voxels, in which case the controller may be configured to classify the voxels into moving voxels corresponding to moving elements in the workcell and static voxels corresponding to static elements in the workcell. In various embodiments, the acquired image data comprises a plurality of surfaces and normals thereto, and the controller is further configured to classify surfaces as corresponding to moving elements in the workcell or corresponding to static elements in the workcell.

The controller may be further configured to compare the static voxels or surfaces acquired during operation of the industrial machinery against the static voxels or surfaces acquired prior to operating the industrial machinery and, based thereon, determine a position shift associated with each of the static voxels or surfaces. The controller may be configured to cause the alert to be issued upon determining that more than a predetermined number of the static voxels have changed in value or that more than a predetermined number of the static surfaces have position shifts exceeding a threshold value.

In various embodiments, the controller is configured to analyze the image data acquired prior to operation of the industrial machinery for identifying a first set of elements in the workcell; analyze the image data acquired during operation of the industrial machinery for identifying a second set of elements in the workcell; compare the second set of elements against the first set of elements; and cause the alert to be issued upon determining that the second set of elements does not match the first set of elements.

The system may include memory for storing a plurality of configurations associated with the industrial machinery, and the controller may be configured to (i) determine, based on the acquired image data, a configuration associated with the industrial machinery during operation thereof, and (ii) cause the alert to be issued upon determining that the configuration determined in step (i) does not match any of the configurations stored in the memory. The controller may be configured to determine, based on the acquired image data, whether speed and safety monitoring requirements are violated and, if so, to cause the alert to be issued. The controller may be further configured to determine whether, in response to a command, the machinery stopped within a prescribed distance and stopping time conforming to speed and separation monitoring requirements.

In some embodiments, the controller is configured to analyze the image data and, based thereon, (i) detect and classify objects in the workcell, and (ii) cause the alert to be issued if an observed behavior of an identified object is inconsistent with its classification. The controller may be further configured to analyze the image data and, based thereon, (i) detect and classify objects in the workcell, (ii) detect and classify static objects in the workcell, and (iii) cause the alert to be issued if an identified object is observed to appear or disappear unexpectedly.

In another aspect, the invention pertains to a method of continuously monitoring a workcell during operation of industrial machinery therein. In various embodiments, the method comprises the steps of acquiring digital image data associated with the workcell; detecting a parameter value associated with the safety system; determining a status of the safety system based at least in part on the detected parameter value; causing an alert to be issued if the status of the safety system does not satisfy a target objective. The digital image data may be acquired by at least sensor, and the method may further comprise monitoring the temperature associated with the sensor(s) and/or monitoring humidity associated with the environment of the sensor(s). Alternatively or in addition, the method may include issuing an alert when a predetermined total cumulative operating time of the sensor(s) has been exceeded.

BRIEF DESCRIPTION OF THE DRAWINGS

The foregoing and the following detailed description will be more readily understood when taken in conjunction with the drawings, in which.

DETAILED DESCRIPTION

Figure 1:
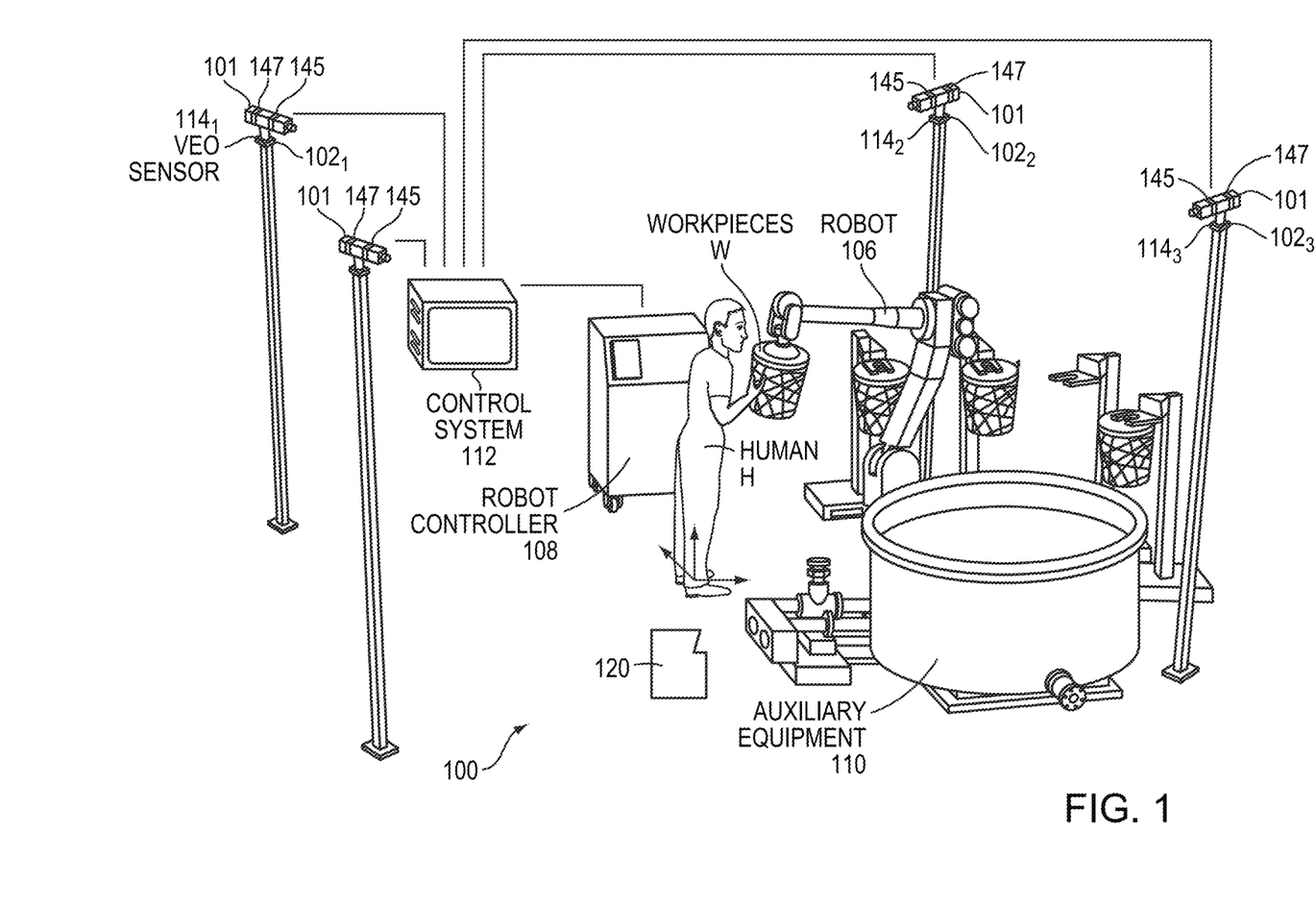
FIG. 1 is a perspective view of a monitored workspace in accordance with an embodiment of the invention.

Refer first to FIG. 1, which illustrates a representative 3D workspace 100 equipped with a safety system including a sensor system 101 having one or more sensors representatively indicated at $102_1$, $102_2$, $102_3$ for monitoring the workspace 100. The sensors $102_{1-3}$ may be conventional optical sensors such as cameras, e.g., 3D ToF cameras, stereo vision cameras, or 3D LIDAR sensors or radar-based sensors, ideally with high frame rates (e.g., between 10 FPS and 100 FPS). The mode of operation of the sensors $102_{1-3}$ is not critical so long as a 3D representation of the workspace 100 is obtainable from images or other data obtained by the sensors $102_{1-3}$. As shown in the figure, sensors $102_{1-3}$ may collectively cover and can monitor the workspace 100, which includes a robot 106 controlled by a conventional robot controller 108. The robot 106 interacts with various workpieces W, and a human operator H in the workspace 100 may interact with the workpieces W and the robot 106 to perform a task. The workspace 100 may also contain various items of auxiliary equipment 110. As used herein the robot 106 and auxiliary equipment 110 are denoted as machinery in the workspace 100.

In various embodiments, data obtained by each of the sensors $102_{1-3}$ is transmitted to a control system 112. In addition, the sensors $102_{1-3}$ may be supported by various software and/or hardware components $114_{1-3}$ for changing the configurations (e.g., orientations and/or positions) of the sensors $102_{1-3}$; the control system 112 may be configured to adjust the sensors so as to provide optimal coverage of the monitored area in the workspace 100. The volume of space covered by each sensor—typically a solid truncated pyramid or solid frustum—may be represented in any suitable fashion, e.g., the space may be divided into a 3D grid of small (5 cm, for example) voxels or other suitable form of volumetric representation. For example, a 3D representation of the workspace 100 may be generated using 2D or 3D ray tracing. This ray tracing can be performed dynamically or via the use of precomputed volumes, where objects in the workspace 100 are previously identified and captured by the control system 112. For convenience of presentation, the ensuing discussion assumes a voxel representation, and the control system 112 maintains an internal representation of the workspace 100 at the voxel level.

Figure 2:
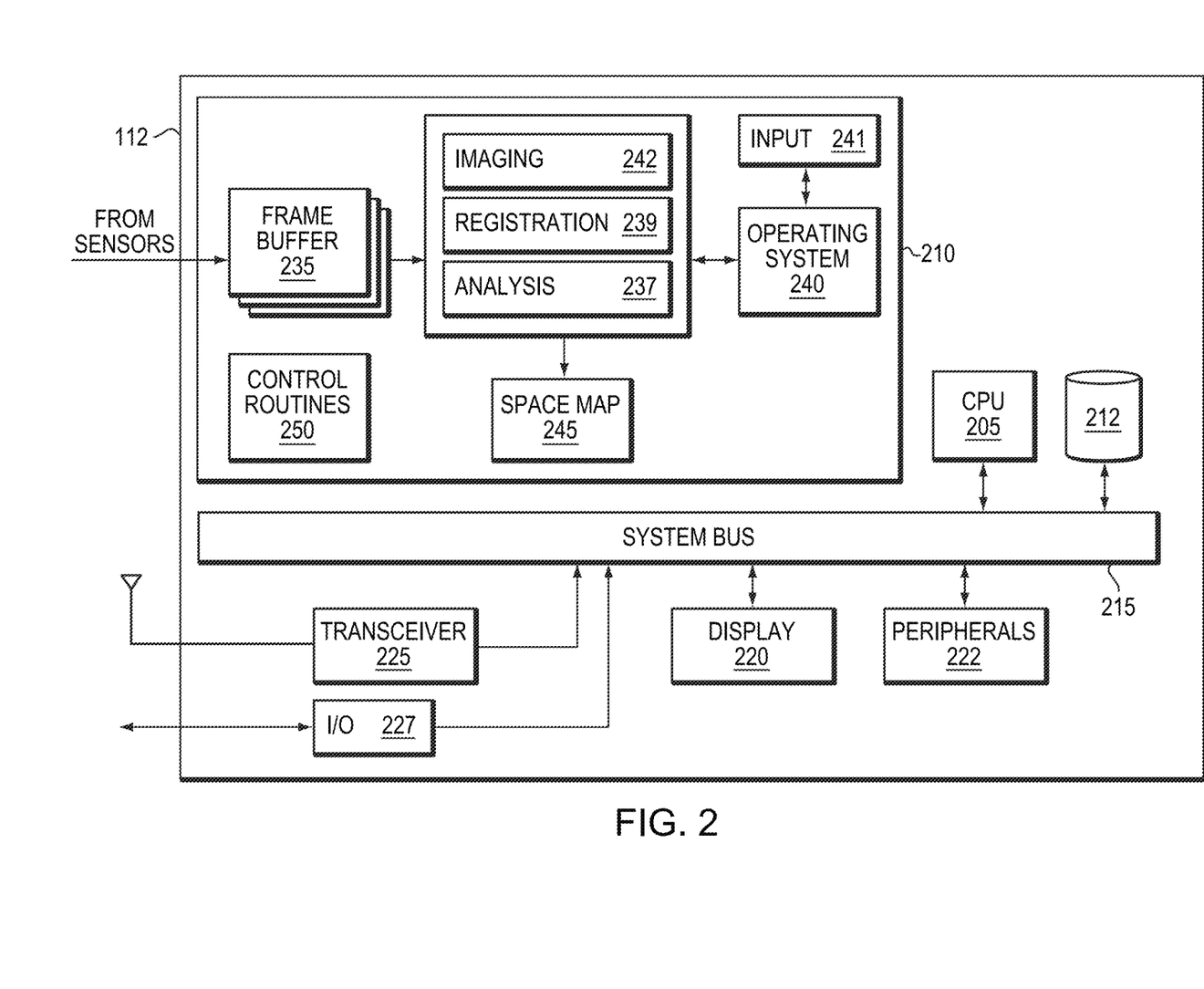
FIG. 2 schematically illustrates a control system in accordance with an embodiment of the invention

FIG. 2 illustrates, in greater detail, a representative embodiment of the control system 112, which may be implemented on a general purpose computer. The control system 112 includes a central processing unit (CPU) 205, system memory 210, and one or more non-volatile mass storage devices (such as one or more hard disks and/or optical storage units) 212. The control system 112 further includes a bidirectional system bus 215 over which the CPU 205, functional modules in the memory 210, and storage device 212 communicate with each other as well as with internal or external input/output (I/O) devices, such as a display 220 and peripherals 222 (which may include traditional input devices such as a keyboard or a mouse). The control system 112 also includes a wireless transceiver 225 and one or more I/O ports 227. The transceiver 225 and I/O ports 227 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with the control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), BLUETOOTH, ZigBee, IrDa, near-field communication (NFC), or other suitable protocol. Furthermore, components of the system may communicate through a combination of wired or wireless paths, and communication may involve both computer and telecommunications networks.

The CPU 205 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 210 may contain a series of frame buffers 235, i.e., partitions that store, in digital form (e.g., as pixels or voxels, or as depth maps), images obtained by the sensors $102_{1-3}$; the data may actually arrive via I/O ports 227 and/or transceiver 225 as discussed above. The system memory 210 contains instructions, conceptually illustrated as a group of modules, that control the operation of CPU 205 and its interaction with the other hardware components. An operating system 240 (e.g., Windows or Linux) directs the execution of low-level, basic system functions such as memory allocation, file management and operation of the mass storage device 212. At a higher level, and as described in greater detail below, an imaging module 242 may register the images acquired by the sensors in the frame buffers 235; an analysis module 237 may analyze the images acquired by the sensors $102_{1-3}$ to determine, for example, whether there is sufficient overlap and/or distinction between the acquired images and/or the coverage area monitored by the sensors $102_{1-3}$; a registration module 239 may register the sensors among themselves based on the images registered in the frame buffers 235 and/or register the sensors $102_{1-3}$ to the machinery in the workspace as further described below; and an input module 241 for receiving one or more external input data from, for example, the display 220, the peripherals 222, the robot controller 108 and/or additional sensors (e.g., other than the sensors $102_{1-3}$) for identifying a state (e.g., an orientation, a position, etc.) of the robot 106 and/or one or more registration objects as further described below. The determined coverage area may be stored in a space map 245, which contains a volumetric representation of the workspace 100 with each voxel (or other unit of representation) labeled, within the space map, as described herein. Alternatively, the space map 245 may simply be a 3D array of voxels, with voxel labels being stored in a separate database (in memory 210 or in mass storage 212).

In addition, the control system 112 may communicate with the robot controller 108 to control the operation or machinery in the workspace 100 using conventional control routines collectively indicated at 250. As explained below, the configuration of the workspace may well change over time as persons and/or machines move about; the control routines 250 may be responsive to these changes in operating machinery to achieve high levels of safety. All of the modules in system memory 210 may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to the microprocessor resident on a target device.

To allow the sensor system 101 to accurately monitor the workspace 100, an initial calibration or registration process registering each sensor 102 with respect to all other sensors and the sensors $102_{1-3}$ to various elements (e.g., the robot 106) in the workspace during initial setup may be necessary; see, e.g., U.S. Pat. No. 10,099,372 and U.S. Ser. No. 16/553,738 (filed on Aug. 28, 2019), the entire disclosures of which are incorporated by reference herein. After the initial calibration/registration process is complete, the sensor system 101 may continuously acquire image data associated with the workspace 100, thereby monitoring the workspace 100 in real time during operation of the robot 106.

In one embodiment, the data obtained by the sensor system 101 during the initial calibration or registration process is processed and characterized into two categories—moving elements, which are supposed to move during operation of the robot 106, and static elements, which are supposed to be static during operation of the robot 106. Approaches to analyzing the sensor data and, based thereon, classifying the voxels into the two categories are provided, for example, in U.S. Pat. No. 10,099,372, the entire disclosure of which is hereby incorporated by reference.

Based on this classification and identification of objects in the workspace (which may, for example, be further classified as moving or stationary), the data obtained by the sensor system 101 may be analyzed to provide object consistency checks. Stationary or moving objects—including clusters of potentially occupied voxels, which may correspond to objects—should not appear or disappear suddenly or unexpectedly (e.g., despite the absence of a mapped intervening object), or move through the workspace at speeds incommensurate with their classifications (or that are physically unrealistic). Failure of an object coherency check may indicate sensor failure or improper recognition or classification of sensed objects by the analysis module 237. Object coherence testing can include entry point checks: objects should not originate from anywhere other than an entry point, i.e., nothing should appear to emerge from or enter spaces considered inaccessible. Failure of an entry point check can indicate a dislodged or improperly positioned sensor, a blocked or unanticipated entry point, or improper voxel classification.

In particular, voxels associated with the static elements are identified as the "background" and can be analyzed and tracked during operation of the robot 106 for background validation. For example, the background voxels acquired during operation of the robot 106 may be compared against that acquired at the initial calibration/registration process; if more than a threshold number (e.g., 10) or fraction of the background voxels move away from their initial positions, the static elements acquired in the current sensor data may be misaligned from their initial positions. As a result, tracking of the workspace 100 utilizing the currently acquired sensor data may be unreliable. In this situation, the calibration or registration process may be performed again in order to correct the misalignment, thereby ensuring human safety.

Additionally or alternatively, the sensor data obtained by the sensor system 101 may be analyzed for consistency. For example, if the workcell is designated to be in a specific area (e.g., on a table), objects outside the designated area (e.g., below the table) should never be seen in the acquired sensor data. Thus, if the sensor data acquired during operation of the robot 106 violates this consistency, the sensor data may be unreliable and the calibration/registration process may have to be performed again.

In various embodiments, consistency validation includes verifying the configurations (e.g., orientations and/or positions) of the moving elements. For example, the robot 106 may have one or more specific configurations when performing a designated task. If the robot's configurations detected by the sensor system 101 during performance of such a designated task do not match any of the specific configurations, consistency is violated. As a result, the control system 112 may default the robot 106 to a safe state (e.g., shutting down the robot 106) and/or restart the calibration/registration process. Consistency validation can also be applied to object tracking and account for object classifications in the workspace; in configurable blanking, tracking of an object can be stopped when it passes behind an obstacle and a predicted location where it should again become visible may be compared with the actual observed location.

Consistency validation may also involve speed and separation monitoring (SSM). ISO 10218 and ISO/TS 15066 describe SSM as a safety function that can enable collaboration between an industrial robot and a human worker. Risk reduction is achieved by maintaining at least a protective separation distance between the human worker and robot during periods of robot motion. This protective separation distance is calculated using information including robot and human worker position and movement, robot stopping distances, measurement uncertainty, system latency and system control frequency. Thus, sensor data may be analyzed to determine whether, in response to a command, the robot stopped within the prescribed distance and stopping time to satisfy SSM requirements. More generally, on an ongoing or periodic basis, sensor data may be analyzed to determine whether functional safety assumptions on the robot remain valid, e.g., does the robot go faster than a speed limit, does a robot stay within its configured zones, etc. Such tests may be applied at a more granular level as well; for example, sensor data may be analyzed to determine whether I/O on a robot is correctly configured, and to validate proper end-effector movement in response to a state change.

In some embodiments, variations of the environmental parameters may affect the accuracy of the sensor data. For example, changes in the temperature and/or humidity in the ambient environment or a temperature increase resulting from the system-generated heat may affect the sensor system's baseline calibration and operating parameters; as a result, tracking of the workspace 100 relying on the data acquired by the sensor system 101 may be inaccurate. Thus, in some embodiments, additional sensors such as environmental sensors (e.g., humidity sensors, temperature sensors, etc.) are employed to monitor the status (such as health, performance and/or aging) associated with the sensor system 101, the software and/or hardware components 114 and/or other safety related components, thereby ensuring tracking accuracy of the workspace 100. For example, referring again to FIG. 1, multiple on-board temperature/humidity sensors 145 may be disposed at multiple locations across the sensors 102—e.g., at the center of the illumination array, on the camera enclosure, and within the camera enclosure internally (one near the primary sensor and one near the secondary sensor)—for detecting the changes or drifts in temperature and/or humidity near the sensors 102 that may affect the sensors' performance. In various embodiments, prior to activating the sensor system 101 for monitoring the workspace, an operating range of the temperature, humidity and/or other environmental parameters associated with the sensors 102 that does not cause significant variations in the sensor performance (e.g., operating parameters, latencies, and noise) is empirically determined. The operating range may then be stored in memory associated with the control system 112. After activation of the sensors 102, the temperature/humidity sensors 145 continuously monitor the temperature/humidity across the sensors 102. Exemplary approaches for calibrating or correcting the sensor data are provided, for example, in U.S. Pat. No. 10,887,578, the entire disclosure of which is hereby incorporated by reference. The properly calibrated and temperature-corrected sensor will be reliable in the operating range. In one embodiment, upon detecting that the sensor data is unreliable, the sensor system 101 may be deactivated and the robot 106 may be switched to a safe mode (e.g., shutdown) in order to ensure safety.

Additionally or alternatively, the system may include multiple operating timers 147, each associated with one of the sensors 102 in the sensor system 101 for recording a total cumulative operating time of the sensor. In various embodiments, prior to activation of the sensors 102, an aging profile of the sensor performance (e.g., variations of the acquired data and/or operating parameters, latencies, noise levels, etc.) is empirically established and stored in memory associated with the control system 112. After the sensors 102 are activated, the timers 147 may keep track of the operation hours of the sensors and periodically send this data to the control system 112. Based thereon and the established aging profile, the control system 112 may determine the expected performance level associated with the sensors. If the expected performance level based on sensor aging satisfies a target objective, the data acquired by the sensors is considered reliable. If, however, the performance level is below the target objective (e.g., the variations of the acquired data and/or operating parameters, the latencies and/or the noise levels exceed corresponding thresholds), the control system 112 may generate an error condition to alert the human that maintenance or replacement of the sensors is required.

It should be noted that the additional sensors 145 and timers 147 described above are exemplary approaches that can be implemented to monitor the status (e.g., health or aging) of the sensor system 101, software and/or hardware components 114 and/or other components in the safety system. One of ordinary skill in the art will understand that other approaches may also be employed and are thus within the scope of the present invention. For example, the control system 112 may continuously analyze the real-time acquired sensor data to determine the performance, such as the latency, noise, and/or focus associated with the sensors 102; this thereby obviates the need of the additional sensors 145 and timers 147. In addition, when the sensors 102 are 3D ToF cameras, they may include modules for self-detecting errors of the signals therein. Further, a safety-rated protocol established based on a common protocol, such as ECC or CRC, may be included to detect errors occurring during the data transmission. Again, upon detection of the errors and/or unsatisfactory performance of the sensor system 101, software and/or hardware components 114 and/or other components in the safety system, a signal may be transmitted to the control system 112, which then issues an alert to the human operator.

Accordingly, various embodiments utilize various approaches to monitor the health, performance and/or status associated with a safety system (e.g., the sensor system 101, the software and/or hardware components 114, and/or other components) that monitors the workspace 100 for ensuring that the data acquired/analyzed by the safety system accurately reflects the state of the workspace. In addition, various embodiments validate the data acquired by the safety system using, for example, background validation and/or consistency validation as described above. Based on the monitoring and/or validation continuously performed during operation of the robot 106, the workspace safety can be improved.

The term "controller" or "control system" used herein broadly includes all necessary hardware components and/or software modules utilized to perform any functionality as described above; the controller may include multiple hardware components and/or software modules and the functionality can be spread among different components and/or modules. Moreover, the entire control architecture may reside within one or more of the sensors. Accordingly, a controller need not be a discrete piece of hardware and software, but may instead be integrated into the sensor design.

For embodiments in which the functions are provided as one or more software programs, the programs may be coded in a suitable language as set forth above. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for continuously monitoring a workcell during operation of industrial machinery, the system comprising:
   a safety system comprising at least one sensor and supporting software and/or hardware for acquiring image data associated with the workcell;
   a monitoring system for detecting a parameter value associated with the safety system; and
   a controller configured to:
      determine a status of the safety system based at least in part on the detected parameter value; and
      cause an alert to be issued if the status of the safety system does not satisfy a target objective,
   wherein the acquired image data comprises a plurality of voxels, the controller being further configured to (i) classify the voxels into moving voxels corresponding to moving elements in the workcell and static voxels corresponding to static elements in the workcell, and (ii) compare the static voxels acquired during operation of the industrial machinery against the static voxels acquired prior to operating the industrial machinery and, based thereon, determine a position shift associated with each of the static voxels.

2. The system of claim 1, wherein the monitoring system comprises at least one temperature sensor for monitoring a temperature associated with the at least one sensor.

3. The system of claim 1, wherein the monitoring system comprises at least one humidity sensor for monitoring humidity associated with an environment of at least one sensor.

4. The system of claim 1, wherein the monitoring system comprises at least one timer for recording a total cumulative operating time of at least one sensor, the timer being configured to transmit a signal to the controller when a predetermined total cumulative operating time has been exceeded.

5. The system of claim 1, wherein at least one sensor is a 3D sensor.

6. The system of claim 5, wherein the 3D sensor is a time-of-flight (ToF) sensor.

7. The system of claim 6, wherein the ToF sensor comprises a module for self-detecting errors of signals therein.

8. The system of claim 1, wherein the monitoring system comprises a safety-rated protocol for detecting errors occurring during data transmission between at least one sensor, the supporting software and/or hardware, and the controller.

9. The system of claim 1, wherein the acquired image data comprises a plurality of surfaces and normals thereto, the controller being further configured to classify surfaces as corresponding to moving elements in the workcell or corresponding to static elements in the workcell.

10. The system of claim 1, wherein the controller is further configured to cause the alert to be issued upon determining that more than a predetermined number of the static voxels have changed in value.

11. The system of claim 1, further comprising memory for storing a plurality of configurations associated with the industrial machinery, the controller being further configured to (i) determine, based on the acquired image data, a configuration associated with the industrial machinery during operation thereof, and (ii) cause the alert to be issued upon determining that the configuration determined in step (i) does not match any of the configurations stored in the memory.

12. The system of claim 1, wherein the controller is further configured to determine, based on the acquired image data, whether speed and safety monitoring requirements are violated and, if so, to cause the alert to be issued.

13. The system of claim 12, wherein the controller is further configured to determine whether, in response to a command, the machinery stopped within a prescribed distance and stopping time conforming to speed and separation monitoring requirements.

14. The system of claim 1, wherein the controller is further configured to analyze the image data and, based thereon, (i) detect and classify objects in the workcell, and (ii) cause the alert to be issued if an observed behavior of an identified object is inconsistent with its classification.

15. The system of claim 1, wherein the controller is further configured to analyze the image data and, based thereon, (i) detect and classify objects in the workcell, (ii) detect and classify static objects in the workcell, and (iii) cause the alert to be issued if an identified object is observed to appear or disappear unexpectedly.

16. A system for continuously monitoring a workcell during operation of industrial machinery, the system comprising:
　a safety system comprising at least one sensor and supporting software and/or hardware for acquiring image data associated with the workcell;
　a monitoring system for detecting a parameter value associated with the safety system; and
　a controller configured to:
　　determine a status of the safety system based at least in part on the detected parameter value; and
　　cause an alert to be issued if the status of the safety system does not satisfy a target objective,
　wherein the acquired image data comprises a plurality of surfaces and normals thereto, the controller being further configured to (i) classify surfaces as corresponding to moving elements in the workcell or corresponding to static elements in the workcell, and (ii) compare the static surfaces acquired during operation of the industrial machinery against the static surfaces acquired prior to operating the industrial machinery and, based thereon, determine a position shift associated with each of the static surfaces.

17. The system of claim 16, wherein the acquired image data comprises a plurality of voxels, the controller being further configured to classify the voxels into moving voxels corresponding to moving elements in the workcell and static voxels corresponding to static elements in the workcell.

18. The system of claim 16, wherein the controller is further configured to cause the alert to be issued upon determining that more than a predetermined number of the static surfaces have position shifts exceeding a threshold value.

19. The system of claim 16, wherein the monitoring system comprises at least one temperature sensor for monitoring a temperature associated with the at least one sensor.

20. The system of claim 16, wherein the monitoring system comprises at least one humidity sensor for monitoring humidity associated with an environment of at least one sensor.

21. The system of claim 16, wherein the monitoring system comprises at least one timer for recording a total cumulative operating time of at least one sensor, the timer being configured to transmit a signal to the controller when a predetermined total cumulative operating time has been exceeded.

22. The system of claim 16, wherein at least one sensor is a 3D sensor.

23. The system of claim 22, wherein the 3D sensor is a time-of-flight (ToF) sensor.

24. The system of claim 23, wherein the ToF sensor comprises a module for self-detecting errors of signals therein.

25. The system of claim 16, wherein the monitoring system comprises a safety-rated protocol for detecting errors occurring during data transmission between at least one sensor, the supporting software and/or hardware, and the controller.

26. The system of claim 16, further comprising memory for storing a plurality of configurations associated with the industrial machinery, the controller being further configured to (i) determine, based on the acquired image data, a configuration associated with the industrial machinery during operation thereof, and (ii) cause the alert to be issued upon determining that the configuration determined in step (i) does not match any of the configurations stored in the memory.

27. The system of claim 16, wherein the controller is further configured to determine, based on the acquired image data, whether speed and safety monitoring requirements are violated and, if so, to cause the alert to be issued.

28. The system of claim 27, wherein the controller is further configured to determine whether, in response to a command, the machinery stopped within a prescribed distance and stopping time conforming to speed and separation monitoring requirements.

29. The system of claim 16, wherein the controller is further configured to analyze the image data and, based thereon, (i) detect and classify objects in the workcell, and (ii) cause the alert to be issued if an observed behavior of an identified object is inconsistent with its classification.

30. The system of claim 16, wherein the controller is further configured to analyze the image data and, based thereon, (i) detect and classify objects in the workcell, (ii) detect and classify static objects in the workcell, and (iii) cause the alert to be issued if an identified object is observed to appear or disappear unexpectedly.

31. A system for continuously monitoring a workcell during operation of industrial machinery, the system comprising:
　a safety system comprising at least one sensor and supporting software and/or hardware for acquiring image data associated with the workcell;
　a monitoring system for detecting a parameter value associated with the safety system; and
　a controller configured to:
　　determine a status of the safety system based at least in part on the detected parameter value; and
　　cause an alert to be issued if the status of the safety system does not satisfy a target objective,
　wherein the controller is further configured to:
　　analyze the image data acquired prior to operation of the industrial machinery for identifying a first set of elements in the workcell;
　　analyze the image data acquired during operation of the industrial machinery for identifying a second set of elements in the workcell;
　　compare the second set of elements against the first set of elements; and cause the alert to be issued upon determining that the second set of elements does not match the first set of elements.

32. The system of claim 31, wherein the monitoring system comprises at least one temperature sensor for monitoring a temperature associated with the at least one sensor.

33. The system of claim 31, wherein the monitoring system comprises at least one humidity sensor for monitoring humidity associated with an environment of at least one sensor.

34. The system of claim 31, wherein the monitoring system comprises at least one timer for recording a total cumulative operating time of at least one sensor, the timer being configured to transmit a signal to the controller when a predetermined total cumulative operating time has been exceeded.

35. The system of claim 31, wherein at least one sensor is a 3D sensor.

36. The system of claim 35, wherein the 3D sensor is a time-of-flight (ToF) sensor.

37. The system of claim 36, wherein the ToF sensor comprises a module for self-detecting errors of signals therein.

38. The system of claim 31, wherein the monitoring system comprises a safety-rated protocol for detecting errors occurring during data transmission between at least one sensor, the supporting software and/or hardware, and the controller.

39. The system of claim 31, wherein the acquired image data comprises a plurality of voxels, the controller being further configured to classify the voxels into moving voxels corresponding to moving elements in the workcell and static voxels corresponding to static elements in the workcell.

40. The system of claim 31, wherein the acquired image data comprises a plurality of surfaces and normals thereto, the controller being further configured to classify surfaces as corresponding to moving elements in the workcell or corresponding to static elements in the workcell.

41. The system of claim 31, further comprising memory for storing a plurality of configurations associated with the industrial machinery, the controller being further configured to (i) determine, based on the acquired image data, a configuration associated with the industrial machinery during operation thereof, and (ii) cause the alert to be issued upon determining that the configuration determined in step (i) does not match any of the configurations stored in the memory.

42. The system of claim 31, wherein the controller is further configured to determine, based on the acquired image data, whether speed and safety monitoring requirements are violated and, if so, to cause the alert to be issued.

43. The system of claim 42, wherein the controller is further configured to determine whether, in response to a command, the machinery stopped within a prescribed distance and stopping time conforming to speed and separation monitoring requirements.

44. The system of claim 31, wherein the controller is further configured to analyze the image data and, based thereon, (i) detect and classify objects in the workcell, and (ii) cause the alert to be issued if an observed behavior of an identified object is inconsistent with its classification.

45. The system of claim 31, wherein the controller is further configured to analyze the image data and, based thereon, (i) detect and classify objects in the workcell, (ii) detect and classify static objects in the workcell, and (iii) cause the alert to be issued if an identified object is observed to appear or disappear unexpectedly.

* * * * *